May 14, 1968  A. SCHMIDT  3,383,143

SLIDE BEARING SHELLS WITH RUBBER JACKET

Filed Oct. 21, 1965

Inventor
ANDREAS SCHMIDT
BY
Kenyon Kenyon
ATTORNEYS

United States Patent Office 3,383,143
Patented May 14, 1968

3,383,143
SLIDE BEARING SHELLS WITH
RUBBER JACKET
Andreas Schmidt, Osterath, Kreis Kempen-Krefeld, Germany, assignor to A. Ehrenreich & Cie, Dusseldorf-Oberkassel, Germany
Filed Oct. 21, 1965, Ser. No. 499,933
Claims priority, application Germany, Mar. 26, 1965, E 28,966
5 Claims. (Cl. 308—26)

ABSTRACT OF THE DISCLOSURE

The subject bearing assembly is designed to provide cushioned support in a bearing having application for use between relatively rotating or oscillating parts. Basically, the bearing assembly is comprised of an inner metal sleeve, an intermediately-disposed split plastic sleeve concentrically arranged on the inner metal sleeve and an outer rubber bushing arranged concentrically with the inner metal sleeve and the intermediately-disposed split plastic sleeve. More particularly, the intermediately-disposed split plastic sleeve is sized to fit on the inner metal sleeve and effect a low-frictional contact therebetween to maintain the inner metal sleeve and intermediately-disposed split plastic sleeve in fixed relationship under normal operating conditions but which will allow rotational movement therebetween under high stress conditions. The outer surface of the intermediately-disposed split plastic sleeve is formed with elevations and depressions that appear, in cross section as symmetrically disposed continuous undulations while the inner surface of the rubber bushing is formed with a mating surface that also appears in cross section, as symmetrically disposed continuous undulations which conform to the contour of the outer surface of the intermediately-disposed split plastic sleeve. In addition, the inner metal sleeve and the intermediately-disposed split plastic sleeve have flanges formed thereon that abut when the bearing is in assembled form. Also included in the design is a flange member formed on the rubber bushing having an inner peripheral groove sized to accommodate the flanges of the inner metal sleeve and intermediately-disposed split plastic sleeve.

My invention relates to a slide bearing shell having a rubber jacket and a plastic sleeve which is provided between the said jacket and an internal metal shell.

In the case of slide bearing shells of the above type which are already known the plastic sleeve is vulcanized on the inside peripheral surface of the rubber jacket and forms a solid cover for the internal metal shell. Therefore, axial movements of the internal metal shell act to translate the plastic shell with respect to the rubber jacket thereby exerting a detrimental shear force on the bond between the plastic sleeve and the rubber jacket.

The primary purpose of the invention is to provide a slide bearing assembly wherein the rubber bushing jacket and plastic sleeve are arranged to avoid the disadvantages mentioned above.

With a view to the realisation of the said purpose the outer surfaces of the plastic shell and the inner surfaces of the rubber jacket are formed with mating longitudinal ribs which are intended to afford a connection means between the plastic shell and the rubber jacket which is resistant to torsional stresses. As a consequence, the plastic sleeve can be slidably mounted on the internal sleeve.

Preferably the surfaces of the plastic shell and of the rubber jacket which are in intimate contact show the same undulation as to their cross section.

In this way a connection which is resistant to torsional stress of the plastic shell with the rubber jacket is effected without vulcanizing. A connection of this sort is not subject to any adverse effects due to an imposition of any axial stress. In the present design axial forces simply result in sliding movements between the plastic shell and the rubber jacket.

In the preferred embodiment the plastic shell is longitudinally slotted to facilitate providing an enclosure wherein positive contact of the internal steel shell by the plastic shell is effected while maintaining the possibility of sliding therebetween under certain conditions.

Slotting may be of a screw type form.

In addition, it has proven to be advantageous to provide longitudinal oil grooves in the inner peripheral surface of the plastic shell.

The drawings show one embodiment of a construction according to the invention, wherein.

The rubber slide bearing shell or the rubber sliding bearing is designed to be inserted into a bore having a diameter which is slightly smaller than the outside diameter of the rubber slide bearing shell.

Figure 1:
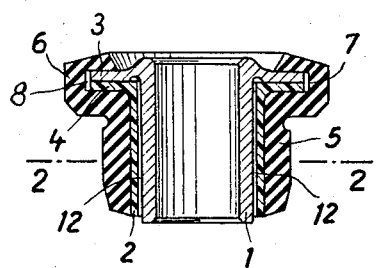
FIG. 1 is a vertical section of a rubber sliding shell.

Structurally, the bearing assembly is comprised of an internal sleeve 1 preferably made from extrusion steel, an intermediately-disposed plastic sleeve 2, preferably made of acetal resin and an outer rubber bushing 5 as seen in FIG. 1. The metal sleeve 1 and the plastic sleeve are maintained in fixed relationship by a friction fit which allows sliding movement therbetween under certain shear stress conditions. In the preferred embodiment, seen in FIG. 1, the intermediately-disposed plastic sleeve 2 if split longitudinally as indicated by detail 11 to facilitate the limited frictional contact with the inner sleeve 1 which the design requires. It is noted that rather than the longitudinal split 11, any other form of split such as a helical split will perform satisfactorily. Additional frictional contact between the inner metal sleeve 1 and the intermediately-disposed split plastic sleeve 2, is provided by flanges 3 and 4 which are formed integrally with sleeves 1 and 2 respectively and are arranged to abut.

Figure 2:
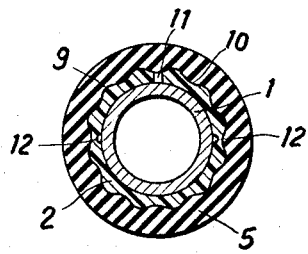
FIG. 2 is a sectional view along the line 2—2 of FIG. 1.

The outer circumferential surface of the intermediately-disposed plastic sleeve 2 is contoured with elevations 9 thereon. In the preferred embodiment, elevations 9 on the split plastic sleeve 2 take the form of longitudinal protuberances which appear in cross-section as continuous undulations as best seen in FIG. 2. The inner surface of the rubber bushing 5 is contoured to mate with the outer surface of the intermediately-disposed split plastic sleeve 2. Therefore, in the preferred embodiment, longitudinal ribs 10 which appear in cross-section as wave crests correspond to the wave troughs of the plastic sleeve 2.

The rubber bushing 5 terminates in a flange 6 having an inner peripheral recess 7 into which the metal sleeve flange 3 and plastic sleeve flange 4 fit to restrain the respective members from relative axial movement. In addition, the intimate contact of flanges 3 and 4 provide another component of frictional contact between the inner metal sleeve 1 and the intermediately-disposed plastic sleeve 2.

The internal groove 7 is sized to afford a peripheral gap 8 when flanges 3 and 4 are inserted therein to thereby insure that no peripheral pressure is exterted by the flange 6 on the flanges 3 and 4.

An additional feature of the design includes oil grooves 12 formed in the inner surface of the intermediately-disposed plastic sleeve 2 to facilitate lubrication thereof.

I claim:

1. In a cushioned bearing assembly having an inner metal sleeve, an intermediately-disposed sleeve of low friction synthetic material arranged concentrically with the inner metal sleeve and an outer rubber bushing arranged concentrically with the inner metal sleeve and the intermediately-disposed sleeve of low friction synthetic material, the improvement which comprises:

the intermediately-disposed sleeve of low friction material having a longitudinal split therein;

the outer surface of the intermediately-disposed sleeve of low friction synthetic material having longitudinally extending elevations and depressions which appear in cross section as symmetrically disposed continuous undulations having the appearance of a continuous sinusoidal wave; and the inner surface of the outer rubber bushing member having mating longitudinal elevations and depressions which appear in cross section as symmetrically disposed continuous undulations having the appearance of a continuous sinusoidal wave which conform to the contour of the intermediately-disposed sleeve of low friction synthetic material.

2. A cushioned bearing assembly as described in claim 1 wherein the inner metal sleeve of the intermediately-disposed sleeve of low friction synthetic material terminate in flanges which, in the assembled bearing, are arranged with the upper surface of the flange on the intermediately-disposed sleeve of low friction synthetic material abutting the lower surface of the flange on the inner metal sleeve and in which the outer rubber bushing is provided with a flange having an inner peripheral recess into which the inner metal sleeve flange and the flange of the intermediately-disposed sleeve of low friction synthetic material fit, the diameter of the inner peripheral recess in the rubber bushing being greater than the diameter of the flange on the inner metal sleeve and the flange on the intermediately-disposed sleeve of low friction synthetic material.

3. A cushioned bearing assembly as described in claim 2 wherein the slot in the intermediately-disposed sleeve of low friction synthetic material is helical.

4. A cushioned bearing assembly as described in claim 2 wherein the inner surface of the intermediately-disposed sleeve of low friction synthetic material has logitudinal recesses formed therein to facilitate lubrication thereof.

5. A cushioned bearing assembly as described in claim 3 wherein the inner surface of the intermediately-disposed sleeve of low friction synthetic material has recesses formed therein to facilitate lubrication thereof.

References Cited

UNITED STATES PATENTS

| | | | |
|---|---|---|---|
| 2,851,314 | 9/1958 | Thomson | 308—26 |
| 3,239,286 | 3/1966 | Harrison | 308—26 |
| 3,268,280 | 8/1966 | Miller | 308—36.1 |
| 3,304,136 | 2/1967 | Muller | 308—36.1 |
| 3,331,642 | 7/1967 | Krauss | 308—26 XR |

MARTIN P. SCHWADRON, *Primary Examiner.*